US010612939B2

(12) United States Patent
Kikkeri et al.

(10) Patent No.: US 10,612,939 B2
(45) Date of Patent: Apr. 7, 2020

(54) GROUND TRUTH ESTIMATION FOR AUTONOMOUS NAVIGATION

(71) Applicant: Microsoft Corporation, Redmond, WA (US)

(72) Inventors: Harshavardhana Kikkeri, Newcastle, WA (US); Stanley T. Birchfield, Sammamish, WA (US); Mihai Jalobeanu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 852 days.

(21) Appl. No.: 14/146,494

(22) Filed: Jan. 2, 2014

(65) Prior Publication Data

US 2015/0185027 A1 Jul. 2, 2015

(51) Int. Cl.
| | | |
|---|---|---|
| G01C 21/34 | (2006.01) | |
| G05B 19/04 | (2006.01) | |
| G05D 1/02 | (2020.01) | |
| G01C 25/00 | (2006.01) | |
| G05D 1/00 | (2006.01) | |

(52) U.S. Cl.
CPC .......... *G01C 25/00* (2013.01); *G05D 1/0088* (2013.01); *G05D 1/027* (2013.01); *G05D 1/0278* (2013.01)

(58) Field of Classification Search
None
See application file for complete search history.

(56) References Cited

U.S. PATENT DOCUMENTS

| | | | | |
|---|---|---|---|---|
| 5,525,883 | A * | 6/1996 | Avitzour | G05D 1/0274 318/568.1 |
| 5,911,767 | A * | 6/1999 | Garibotto | G01S 3/783 348/119 |
| 7,587,260 | B2 * | 9/2009 | Bruemmer | G06N 3/008 318/567 |
| 7,634,336 | B2 | 12/2009 | Chae et al. | |
| 7,765,027 | B2 | 7/2010 | Hong et al. | |
| 7,965,935 | B2 | 6/2011 | Takeuchi | |
| 7,974,738 | B2 * | 7/2011 | Bruemmer | G06N 3/008 318/568.12 |

(Continued)

OTHER PUBLICATIONS

Claudio Facchinetti et al., "Self-Positioning Robot Navigation Using Ceiling Image Sequences," Dec. 5-8, 1995, University of Neuchatel Institut for Microtechnology, ACCV '95, pp. 1-5.*

(Continued)

*Primary Examiner* — Thomas G Black
*Assistant Examiner* — Demetra R Smith-Stewart
(74) *Attorney, Agent, or Firm* — International IP Law Group, PLLC

(57) ABSTRACT

A system and method for ground truth estimation of an autonomous navigation system is described. The method includes calibrating a ground truth estimation system for the navigator, by determining a calibration pose of the navigator as disposed in relation to each of a plurality of landmarks during a calibration period. The method also includes directing the navigator to travel to a sequence of waypoints, the waypoints including a selected sequence of the landmarks. The method further includes determining the ground truth estimation based on an accuracy pose of the navigator as disposed in relation to the sequence of landmarks, and the calibration poses for the sequence of landmarks.

18 Claims, 15 Drawing Sheets

(56) References Cited

U.S. PATENT DOCUMENTS

| | | | | |
|---|---|---|---|---|
| 8,073,564 | B2* | 12/2011 | Bruemmer | G06N 3/008 700/245 |
| 8,175,617 | B2* | 5/2012 | Rodriguez | 455/456.1 |
| 8,368,759 | B2 | 2/2013 | Yoo et al. | |
| 8,594,840 | B1* | 11/2013 | Chiappetta et al. | 700/245 |
| 8,774,970 | B2* | 7/2014 | Knopow | A47L 5/28 700/245 |
| 8,930,023 | B2* | 1/2015 | Gutmann et al. | 700/258 |
| 9,002,511 | B1* | 4/2015 | Hickerson | G01S 17/026 700/245 |
| 2004/0071315 | A1* | 4/2004 | Neely | G01S 13/74 382/103 |
| 2004/0193339 | A1* | 9/2004 | Hulden | G05D 1/0272 701/23 |
| 2005/0190972 | A1 | 9/2005 | Thomas et al. | |
| 2006/0188131 | A1* | 8/2006 | Zhang | G06T 7/0044 382/103 |
| 2007/0150097 | A1* | 6/2007 | Chae et al. | 700/245 |
| 2010/0256908 | A1 | 10/2010 | Shimshoni et al. | |
| 2011/0196563 | A1 | 8/2011 | Yturralde et al. | |
| 2013/0138247 | A1* | 5/2013 | Gutmann | G05D 1/0231 700/253 |
| 2014/0195149 | A1* | 7/2014 | Yang | G01S 5/0252 701/445 |
| 2015/0304634 | A1* | 10/2015 | Karvounis | G06T 7/002 348/46 |

OTHER PUBLICATIONS

Amigoni, et al., "Good Experimental Methodologies for Robotic Mapping: A Proposal", In IEEE International Conference on Robotics and Automation, Apr. 10, 2007, 6 pages, Milano, Italy.

Baltes, Jacky, "A Benchmark Suite for Mobile Robots", In IEEE/RSJ International Conference on Intelligent Robots Systems, vol. 2, Oct. 2000, 6 pages.

Bonarini, et al., "RAWSEEDS: Robotics Advancement through Web-publishing of Sensorial and Elaborated Extensive Data Sets", In Proceedings of Intelligent Robots and Systems, vol. 6, Oct. 10, 2006, 5 pages.

Burgard, et al., "A Comparison of SLAM Algorithms based on a Graph of Relations", In IEEE/RSJ International Conference on Intelligent Robots and Systems, Oct. 10, 2009, 7 pages.

Ceriani, et al., "Rawseeds Ground Truth Collection Systems for Indoor Self-Localization and Mapping", In Journal of Autonomous Robots, vol. 27, Issue 4, Sep. 2009, 19 pages.

Jacoff, et al., "Test Arenas and Performance Metrics for Urban Search and Rescue Robots", In IEEE/RSJ International Conference on Intelligent Robots and Systems, vol. 4, Oct. 27, 2003, pp. 3396-3403.

Kummerle, et al., "On Measuring the Accuracy of SLAM Algorithms", In Journal of Autonomous Robots, vol. 27, Issue 4, Nov. 2009, 27 pages, Freiburg, Germany.

Lin, et al., "A Robot Indoor Position and Orientation Method based on 2D Barcode Landmark", In Journal of Computers, vol. 6, Issue 6, Jun. 2011, pp. 1191-1197.

Scharstein, et al., "A Taxonomy and Evaluation of Dense Two-Frame Stereo Correspondence Algorithms", In International Journal of Computer Vision, May 2002, 35 pages.

Smith, et al., "The New College Vision and Laser Data Set", In International Journal of Robotics Research, vol. 28, Issue 5, May 2009, 6 pages.

Sturm, et al., "A Benchmark for the Evaluation of RGB-D SLAM Systems", In IEEE/RSJ International Conference on Intelligent Robots and Systems, Oct. 7, 2012, 8 pages.

Sturm, et al., "Towards a Benchmark for RGB-D SLAM Evaluation", In Proceedings of the RGB-D Workshop on Advanced Reasoning with Depth Cameras at Robotics: Science and Systems, Jun. 2011, 2 pages.

Wisspeintner, et al., "RoboCupHome: Scientific Competition and Benchmarking for Domestic Service Robots", In Proceedings of Interaction Studies, vol. 10, Issue 3, May 13, 2009, 29 pages.

Zhang, Zhengyou, "A Flexible New Technique for Camera Calibration", In IEEE Transactions on Pattern Analysis and Machine Intelligence, vol. 22, Issue 11, Nov. 2000, 5 pages.

\* cited by examiner

100

300

1000

1200

GROUND TRUTH ESTIMATION FOR AUTONOMOUS NAVIGATION

BACKGROUND

Ground truth estimation is useful for objectively comparing different systems, measuring the progress of goals, and determining whether a system is qualified for a given use. While performance metrics and benchmarks are common in other engineering domains, as well as other branches of robotics, (e.g., industrial manipulators), autonomous navigation lacks such established metrics and methodologies. It may be that quantifying the performance of navigation systems is difficult, for reasons ranging from theoretical (identifying parameters for measurement) to practical (defining what the environment is to look like). Further, accurately and independently determining the position of the robot (ground truth) may be complex, expensive, and intrusive.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the subject innovation. Its sole purpose is to present some concepts of the claimed subject matter in a simplified form as a prelude to the more detailed description that is presented later.

The claimed subject matter includes a system and method to evaluate the performance of an autonomous navigation system. In embodiments, a method for ground truth estimation for an autonomous navigation system (navigator) includes calibrating a ground truth estimation system for the navigator, by determining a calibration pose of the navigator as disposed in relation to each of a plurality of landmarks during a calibration period. The navigator is directed to travel to a sequence of waypoints comprising a sequence of the landmarks. The ground truth estimation is determined based on an accuracy pose of the navigator as disposed in relation to the sequence of landmarks, and the calibration poses for the sequence of landmarks.

In embodiments, a system for ground truth estimation includes a processing unit and a system memory. The system memory stores code configured to direct the processing unit to calibrate a ground truth estimation system for the navigator, by determining a calibration pose of the navigator as disposed in relation to each of a plurality of landmarks during a calibration period, the landmarks mounted on a ceiling above an environment navigated by the navigator. The system memory also stores code configured to direct the processing unit to direct the navigator to travel to a sequence of waypoints comprising a sequence of the landmarks. The system memory further stores code configured to determine the ground truth estimation based on an accuracy pose of the navigator as disposed in relation to the sequence of landmarks, and the calibration poses for the sequence of landmarks.

Embodiments include one or more computer-readable storage memory devices for storing computer-readable instructions. The computer-readable instructions provide a ground truth estimation system when executed by one or more processing devices. The computer-readable instructions include code configured to calibrate a ground truth estimation system for a robot, by determining a calibration pose of the robot as disposed in relation to each of a plurality of landmarks during a calibration period, the landmarks mounted on a ceiling above an environment navigated by the robot. The computer-readable instructions also include code configured to direct the robot to travel to a sequence of waypoints comprising a sequence of the landmarks, the sequence being determined based on a map generated by the robot during the calibration period. The computer-readable instructions also include code configured to determine the ground truth estimation based on an accuracy pose of the navigator as disposed in relation to the sequence of landmarks, and the calibration poses for the sequence of landmarks.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
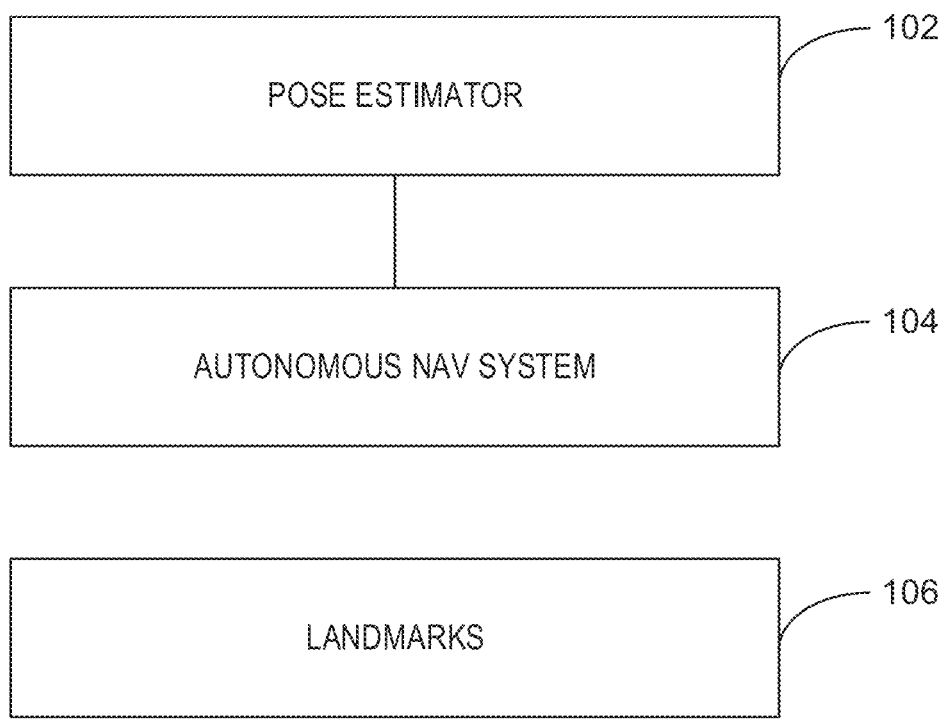
FIG. 1 is a block diagram of a ground-truth estimation system, in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process and a component can be localized on one computer and/or distributed between two or more computers. The term, processor, is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as advantageous over other aspects or designs.

In many ground-truth systems, autonomous navigation is evaluated using externally mounted sensors, which is resource intensive, and does not scale well. The claimed subject matter involves a simple outfitting of an environment, i.e., placing foam boards with printed patterns at specified waypoints on a ceiling, along with an upward facing camera on the autonomous navigator. Measuring the accuracy and precision of position and orientation at a set of waypoints along the path may sufficiently approximate the overall navigation performance. Advantageously, the choice of waypoints may be arbitrary, and commonly task- and environment-specific. Accordingly, such a system can be used to test and validate an independent and separate navigation system. Additionally, the system can be used as part of a navigation system providing relative or absolute positioning information, like an indoor global positioning system (GPS).

Because the system may be inexpensive, and easy to set up, it scales well and is thus applicable to real indoor environments of virtually any size, and any use. Additionally, the limited impact of the foam boards on the indoor environment enables measuring navigation reliability over long running times. This approach makes it possible to test arbitrary mobile robot systems.

FIG. 1 is a block diagram of a ground-truth estimation system 100, in accordance with the claimed subject matter. The system 100 includes a pose estimator 102, an autonomous navigation system 104, and landmarks. The pose estimator 102 may be a component of a computing device that estimates the pose of an on-board camera (not shown) of the autonomous navigation system 104. The pose estimator 102 is connected, through network or bus, with the autonomous navigation system 104, whereby the pose estimator 102 uses data provided by the camera.

The landmarks are inexpensive foam boards with distinct patterns mounted throughout an environment for autonomous navigation. Using an image of the pattern obtained by an on-board camera, the pose estimator 102 computes the pose of an autonomous navigation system with respect to the pattern. The pose estimator 102 may be included in the autonomous navigation system (connected over a bus), or may be external to the autonomous navigation system (connected over a wireless network, for example). It is noted that embodiments are described herein with respect to indoor environments and wheeled robots. These are merely examples of autonomous navigation systems 104 and their environments, and are not intended to be limitations.

Using landmarks provides accurate metric estimates of, e.g., a mobile robot's position and orientation in arbitrarily-sized environments over arbitrarily-long trial periods. Advantageously, outfitting a new environment for a robot's navigation takes less setup time than typical approaches where multiple sensors, cameras, and so on, are deployed. Accordingly, indoor navigation systems may be evaluated in arbitrarily large environments. Further, example embodiments involving a state-of-the-art navigation system provide a richer, quantified representation of the accuracy and robustness of navigation system than possible with current approaches.

A calibration procedure is performed to determine the tilt of the floor underneath each landmark 106. A separate calibration procedure is used to determine the transformation between the x-y-z coordinate system of the camera (which is mounted on the robot) and the x-y-z coordinate system of the robot. After these steps, the system is in place and can be used to evaluate the performance of a robot navigation system automatically and for indefinite periods of time.

The landmarks 106 are foam boards on which a pattern is printed that enables the pose estimator 102 to determine the pose of the camera with respect to the landmark 106. Possible choices for patterns include various augmented reality tags, or otherwise predetermined configurations of monochrome or color shapes, to facilitate detection and pose estimation. One example landmark 106 uses a custom designed pattern consisting of a 14×10 black-and-white checkerboard with the inner 4×4 square area replaced by four circles, which are centered with respect to each of the four quadrants of the inner square area. Beyond the radius of each circle are four arcs of varying length and spacing, enabling the circles to be distinguished from one another. This pattern is readily detectable, even when a significant portion of the checkerboard is occluded from the field of view of the on-board camera. Further, the landmark 106 enables the orientation of the pattern to be determined. The landmarks 106 are oriented horizontally and attached to a ceiling (or otherwise mounted on a stand) so that they can be viewed by an upward-facing camera. In another embodiment, a downward facing camera is used with landmarks 106 on the floor. The landmark 106 is perpendicular to the possible direction of motion of the robot. For example, a robot travelling on ground, the landmarks are placed above or below the robot's path of travel. For a robot climbing walls, the landmarks 106 can be on the wall at different heights, and the camera is side-facing.

When the landmark 106 is visible in the current field-of-view of the camera, pose estimator 102 computes the 7 degree-of-freedom pose of camera in three dimensional (3D) space. In one embodiment, the landmark's pose in a camera-centric coordinate system, is converted to find the camera's pose in the landmark 106-centric coordinate system.

In an embodiment of the claimed subject matter, a robot's gyroscope can be calibrated by spinning the robot underneath a landmark, and correcting for the error between the gyroscope-calculated heading change, and the ground truth system-detected heading change. Similarly, accelerometer, motion, and other like sensors can be calibrated.

Example embodiments ignore the yaw and pitch angles, since they are typically too noisy for ground truth estimation. Although the robot drives on a relatively flat floor, the ceiling height may not be constant throughout an environment. Thus, the robot's z value (along the optical axis) is used to determine camera pose. As a result, the x, y, and z coordinates are retained, along with the roll of the camera about its optical axis, which is directly related to the orientation of the robot.

There are four coordinate systems that are relevant to ground truth estimation. The image coordinate system is placed at the upper-left of the image plane and oriented along the image axes. The camera coordinate system is centered at the focal point and oriented in the same direction as the image coordinate system. The robot coordinate system is centered with the robot and aligned with the robot driving direction. The landmark 106 coordinate system is centered on the landmark 106 and aligned with the checkerboard. Except for the image coordinate system, which is measured in pixels, all measurements are in meters.

Figures 2A, 2B:
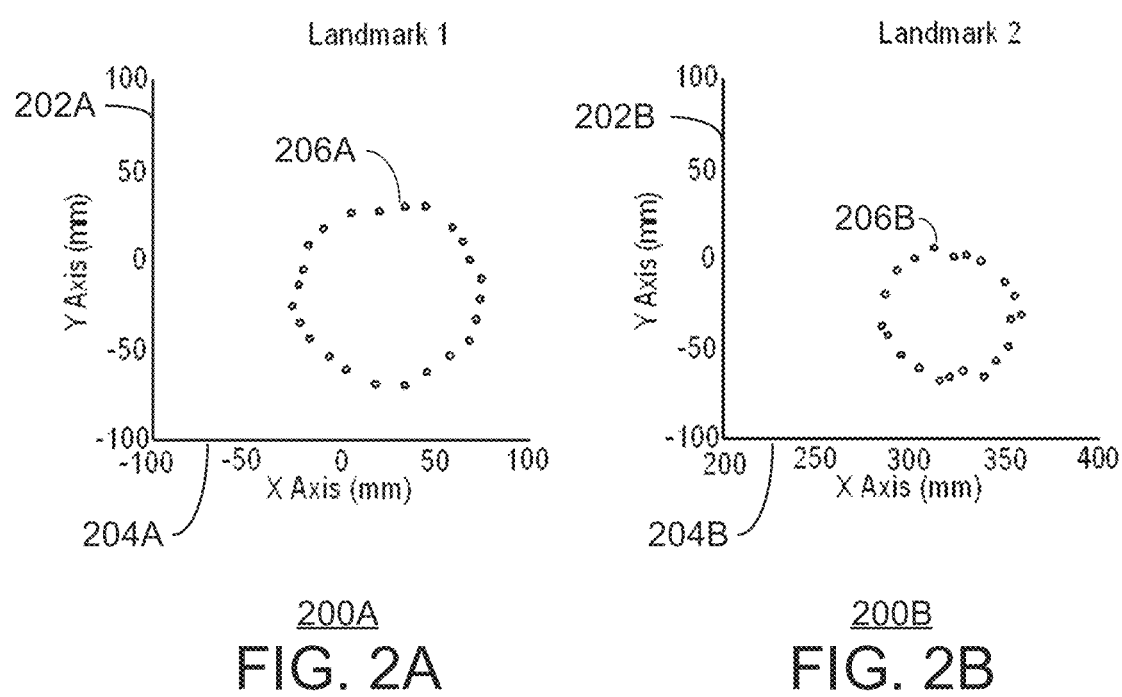
FIGS. 2A-2B are x-y coordinate systems showing circles traced by optical axis for an example autonomous navigation system, in accordance with the claimed subject matter.

FIGS. 2A-2B are x-y coordinate systems 210A, 210B showing circles traced about an optical axis for an example autonomous navigation system, in accordance with the claimed subject matter. The coordinate systems 210A, 210B include y-axis 212A 212B, x-axis 214A, 214B, and the x-y coordinates 216A, 216B of the circle traced about the optical axis.

Calibrating an image-to-camera coordinate system transformation involves estimating the internal camera parameters, using known techniques. For camera-to-robot coordinate system transformation, six parameters are estimated: the tilt, $\phi_c$, of the camera with respect to gravity, the azimuth, $\theta_c$, of the camera tilt plane (i.e., the plane containing the gravity vector and the optical axis) with respect to the forward direction of the robot, the tilt, $\phi_f$, of the floor (in the immediate vicinity below the landmark 106) with respect to gravity, the azimuth, $\theta_f$, of the floor tilt plane (i.e., the plane containing the gravity vector and the normal vector to the floor) with respect to the positive x axis of the landmark 106 coordinate system, and the lateral offset of the focal point from the robot center, expressed in polar coordinates as $d_{rc}$ and $\theta_{rc}$.

To determine these parameters, the camera is placed directly under the landmark 106 using a self-leveling line laser so that the vertical laser beams (the horizontal beams are not used) intersect the center of the image and the center of the landmark 106. The robot is rotated by fixed increments, so that the axis of rotation passes through the focal point. As shown, the robot was rotated in 25-degree increments, leading to 34 data points. The filled data point is the one for which the robot was aligned with the landmark 106 at $\theta=0$.

When the camera tilt is non-zero, this procedure causes the optical axis to trace the shape of a cone about the axis of rotation, which is assumed to be perpendicular to the floor. As the robot is rotated, a pose estimator 102 determines the (x, y) coordinates 216A, 216B, each of which traces the circles shown on the graphs 210A, 210B.

Figure 3:
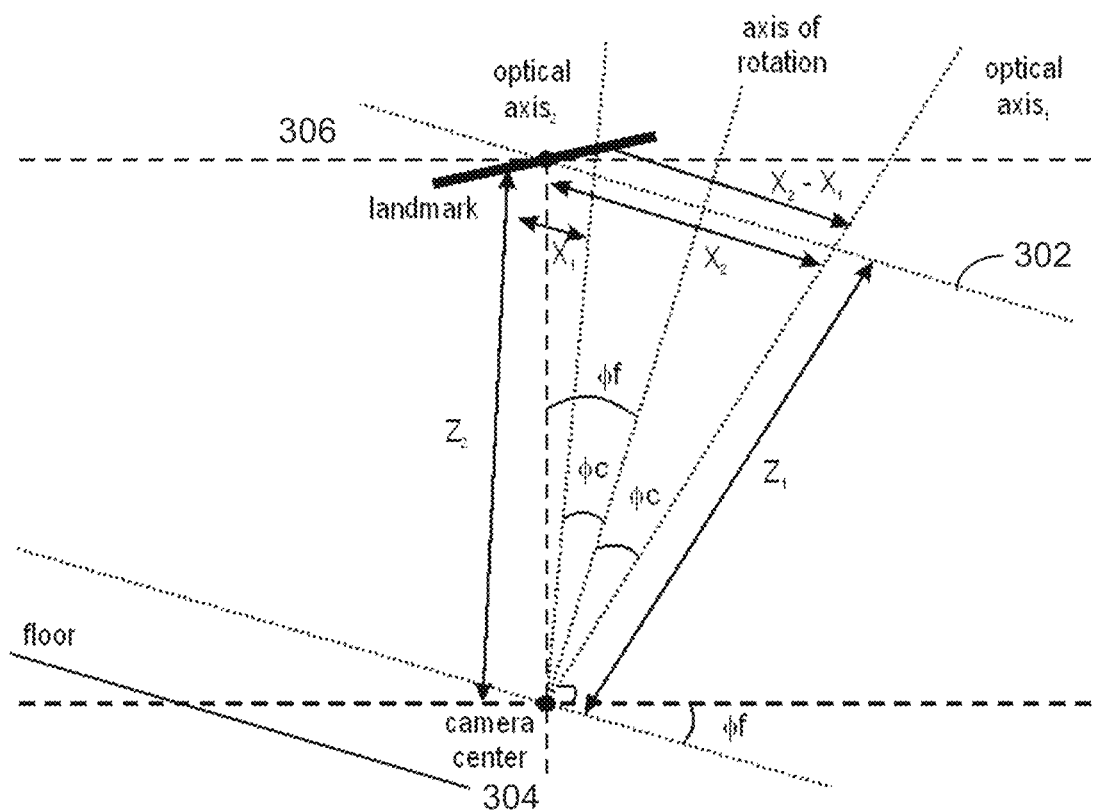
FIG. 3 is a diagram of a location of the autonomous navigation system, parameterized for ground truth estimation, in accordance with the claimed subject matter.

FIG. 3 is a diagram of a location 300 of the autonomous navigation system, parameterized for ground truth estimation, in accordance with the claimed subject matter. FIG. 3. Location 300 shows a side view of a simplified camera-to-robot calibration process. Considering the vertical xz-plane 302 shown, the pose estimator 102 yields the pose $(x_1, z_1)$ of the camera with respect to the landmark 106. The robot is rotated 280 degrees, and the pose estimator 102 estimates the pose $(x_2, z_2)$. From these measurements, the quantities of interest, namely $\phi_c$ and $\phi_f$ can be computed. It is noted that the image plane (not shown) is perpendicular to the optical axis and is not (in general) parallel to the floor.

More specifically, location 300 shows a side view of the geometry of an autonomous navigation system as the camera is rotated by 180 degrees, sliced by the xz-plane 302. The pose estimator 102 measures the (x, y, z) coordinates of the target 306 with respect to the camera 304 both before and after the rotation, leading to $(x_1, y_1, z_1)$ and $(x_2, y_2, z_2)$. From the figure, the camera tilt is given by $\phi_c=\sin^{-1}((x_2-x_1)/2z)$, and the floor tilt is given by $\phi_f=\sin^{-1}((x_1+(x_2-x_1)/2)/z)=\sin^{-1}((x_2+x_1)/2z)$, where $z=(z_1+z_2)/2$. It is noted that $(x_2-x_1)/2$ is the radius of the circle, while $(x_2+x_1)/2$ is the distance from the landmark 106 center to the center of the circle. In the case of zero floor tilt, $\phi_f=0$, $x_1=x_2=x$, and $\phi_c=\sin^{-1}(x/z)$.

Figures 4A, 4B:
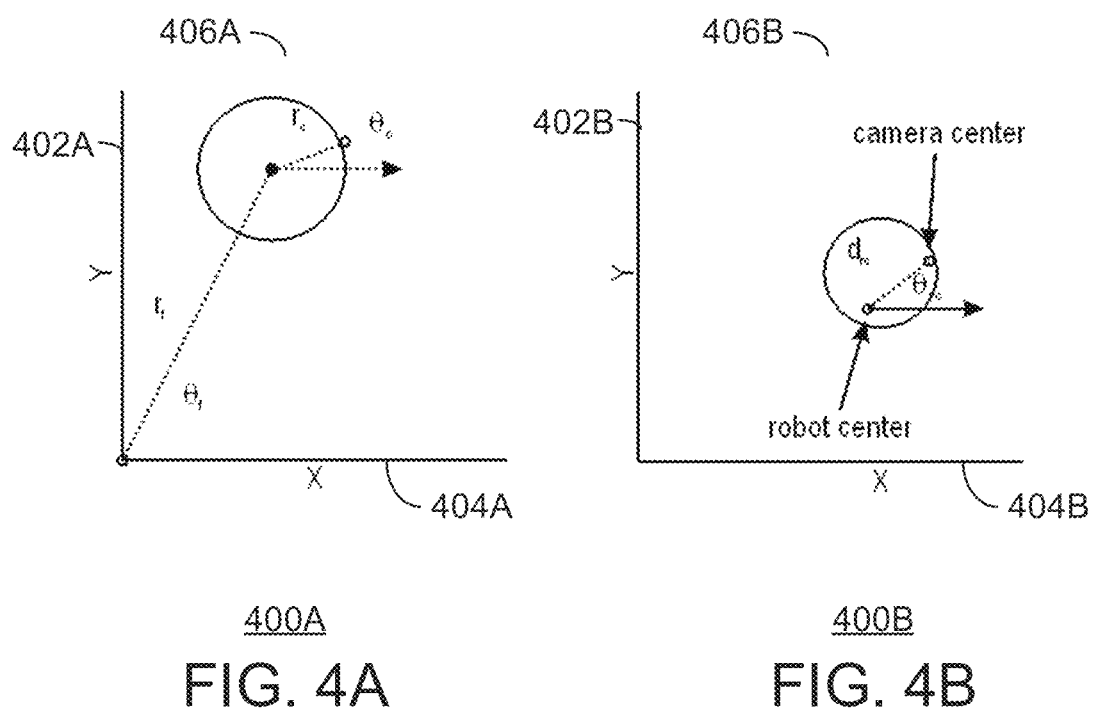
FIG. 4A is an x-y coordinate system showing a circle traced about an optical axis for an example autonomous navigation system, in accordance with the claimed subject matter.
FIG. 4B is an x-y coordinate system showing a robot-to-camera offset for an example autonomous navigation system, in accordance with the claimed subject matter.

FIG. 4A is an x-y coordinate system 400A showing a circle 406A traced about an optical axis for an example autonomous navigation system, in accordance with the claimed subject matter. In one example implementation, the robot was rotated to each of 0, 90, 180, and −90 degree positions. The resultant $(x_1, y_1, i=1:4)$, readings from an example pose estimator are noted. The circle 406A traced by the optical axis yields 5 of the 7 calibration parameters.

The center $(c_x, c_y)$ of the circle is calculated as the mean of the positions, where n=4. The radius of the circle is given by the average Euclidean distance to the center, and the distance from the circle center to the origin is given. Accordingly, the camera tilt is given by $\phi_c=\sin^{-1}(r_t/z)$, the floor tilt being $\phi_f=\sin^{-1}(r_f/z)$, and the floor azimuth is $\theta_f=\text{a tan } 2(c_y, c_x)$. Assuming that $(x_1, y_1)$ corresponds to $\theta=0$ when the robot is aligned with the landmark 106, then the camera azimuth is $\theta_c=\text{a tan } 2(y_1, x_1)$, and the camera-to-robot offset is measured on the ground to determine the distance $d_{rc}$ between the robot and camera centers, as well as the angle $\theta_{rc}$.

FIG. 4B is an x-y coordinate system 400B showing a robot-to-camera offset 406B for an example autonomous navigation system, in accordance with the claimed subject matter. The 2 additional parameters capture the robot-to-camera offset 406B.

Once the system has been calibrated, the tilt-corrected 2D camera pose in the ground plane (that is, corrected for floor tilt) for a given 3D pose (x, y, z) and θ is given by $$x' = x - z \sin \phi_c \cos \theta_c + \theta - z \sin \phi_f \cos \theta_f \quad (1)$$

$$y' = y - z \sin \phi_c \sin \theta_c + \theta - z \sin \phi_f \sin \theta_f \quad (2)$$

$$\theta' = 0. \quad (3)$$

Note that the heading is not affected by tilt. The robot pose is then calculated as a simple pose transformation:

$$\theta_r = \theta' + \theta_{rc} \quad (4)$$

$$x_r = x' + d_{rc} \cos \theta_r \quad (5)$$

$$y_r = y' + d_{rc} \sin \theta_r. \quad (6)$$

Figure 5:
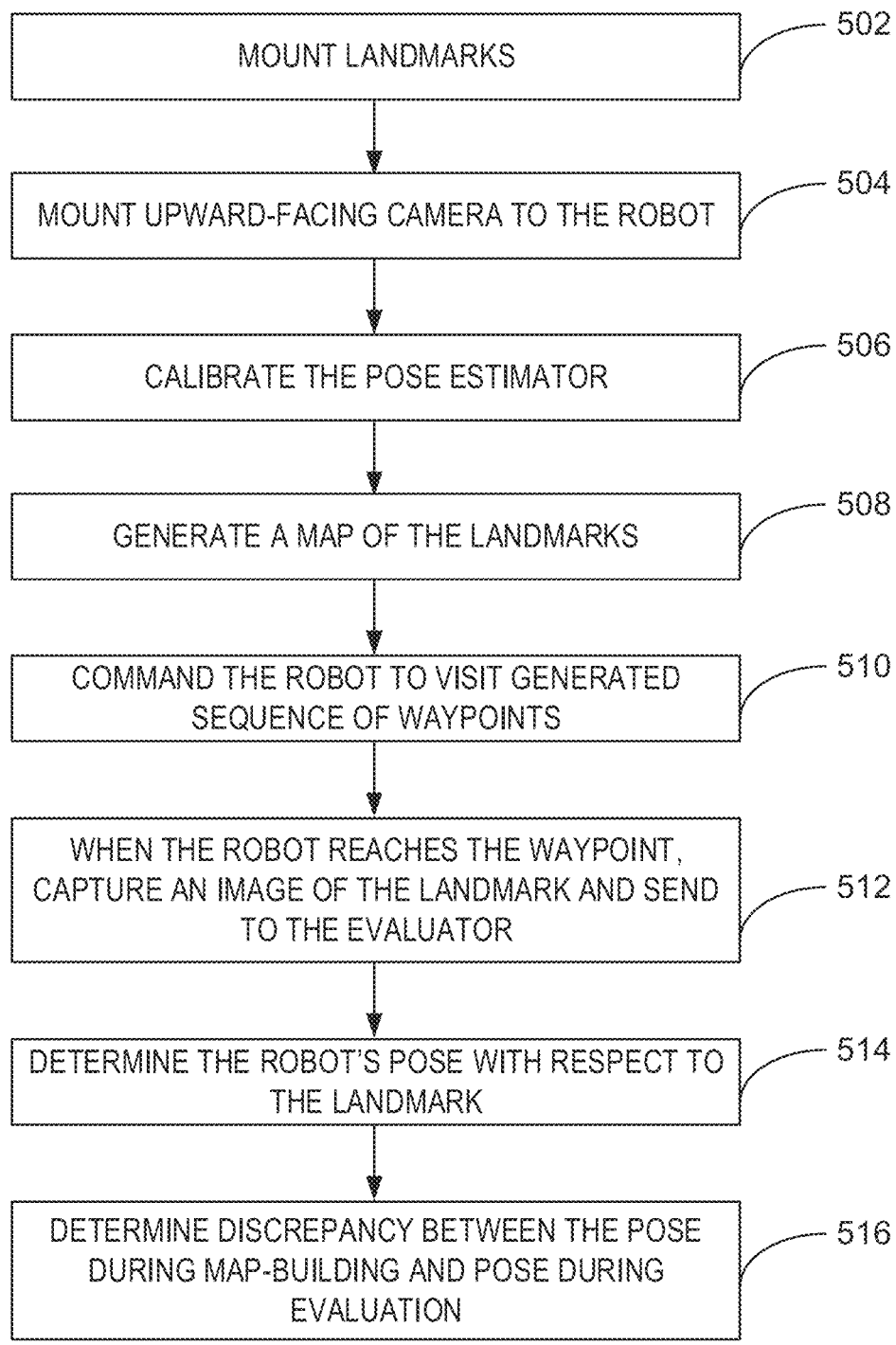
FIG. 5 is a process flow of a method 500 for ground truth estimation on an autonomous navigation system, in accordance with the claimed subject matter.

FIG. 5 is a process flow of a method 500 for ground truth estimation on an autonomous navigation system, in accordance with the claimed subject matter. The method 500 begins at block 502 where the landmarks 106 are mounted. At block 504, the upward facing camera is mounted on the robot. At block 506, the pose estimator 102 is calibrated, as described above. It is noted that once calibrated, the ground truth estimation system 100 is ready to be used to measure the performance of the autonomous navigation system 104 automatically and for arbitrary lengths of time.

At block 508, the robot generates a map of the landmarks 106 in the environment. The type of the map is not relevant to the techniques described herein, thus enabling different approaches for comparison. The robot may generate a 2D metric map, 3D metric map, topological map, topo-geometric map, or otherwise. In an alternative, the robot may operate reactively, for example avoid obstacles while following walls. In reactive operation, the robot's motor commands are based solely upon immediate sensor input, or at least sensor input within a relatively small time window. Essentially, this means that the robot does not store any state of the world, such as a map of any kind.

In embodiments, the robot is driven around the environment to build the map. The robot can be driven manually, or it can autonomously explore. Whenever the robot is under a landmark 106 for the first time, the location of the landmark is recorded with respect to the map being constructed. Additionally, the pose estimator 102 analyzes the image from the upward-facing camera and, with calibration, determines the robot's pose with respect to the landmark 106. It is noted that this approach decouples the map representation of the navigation system being evaluated from the evaluator. Once the robot's map has been built, the system being evaluated contains a set of locations (for the landmarks) on its internal map. Similarly, the evaluator also contains a set of locations with respect to the landmarks 106. Each landmark 106 is associated with an ID, and this ID is the same in both sets of locations to enable correspondence to be made between the navigation system 104 being evaluated and the evaluator.

At block 510, the evaluator generates a sequence of waypoints (IDs for the locations of the landmarks 106), and commands the robot to visit these waypoints in sequence.

At block 512, when the robot reaches the desired location (waypoint), an image of the landmark is captured, and sent to the evaluator. At block 514, the evaluator analyzes the captured image to determine the robot's pose with respect to the landmark 106. At block 516, the evaluator determines any discrepancy between the camera pose during map-building and the camera pose during evaluation. The discrepancy between the pose of the robot during map-building and the pose of the robot during evaluation yields an indication of the accuracy of the navigation system 104.

The experimental results are described into two parts, evaluating the accuracy of the pose estimator 102, then validating the proposed method by measuring the performance of a state-of-the-art navigation system. To evaluate the accuracy of the pose estimator 102, a 24×21 inch checkerboard printed on a 570×436 mm foam board was attached to the ceiling of an experimental environment. Each square of the checkerboard measured 43:633:6 mm. The landmark 106 was placed 2200 mm above an example autonomous navigation system capable of x-y translation within a precision of 0.0635 mm. A camera was attached, facing upward, with a 83-degree field of view, and capable of capturing images at a resolution of 1280×720. The camera could see the landmark 106 from a distance of 400 to 4000 mm Δt the distance of 3200 mm, the checkerboard occupied a space of 300×220 pixels in the image. To reduce effects due to the low contrast caused by ceiling lights, the automatic gain control was turned off, and the exposure level reduced. The camera was rotated till the pose estimator 102 indicated zero degree pan. This was independently validated by making sure that the checkerboard edges were parallel to the image edge in the captured image. The long edge of the navigator was aligned with the long end of the checkerboard. To align the navigator axis with the landmark 106 axis, the camera was moved along one direction and the navigator was rotated until the pose estimator 102 showed change in one direction. The navigator was also calibrated by moving it to the home location. The navigator was then moved in the x and y directions until the pose estimator 102 indicated the (x, y, z) offset to be (0, 0, 0). This was considered as the origin and the position was noted.

Once calibrated, the navigator was moved within the 1320×640 mm area at 5 mm increments. At each position, the navigator was stopped for 2 to 3 seconds to remove any vibration. An image was taken by the camera, and the pose estimator 102 estimated the pose of the camera.

Figure 6:
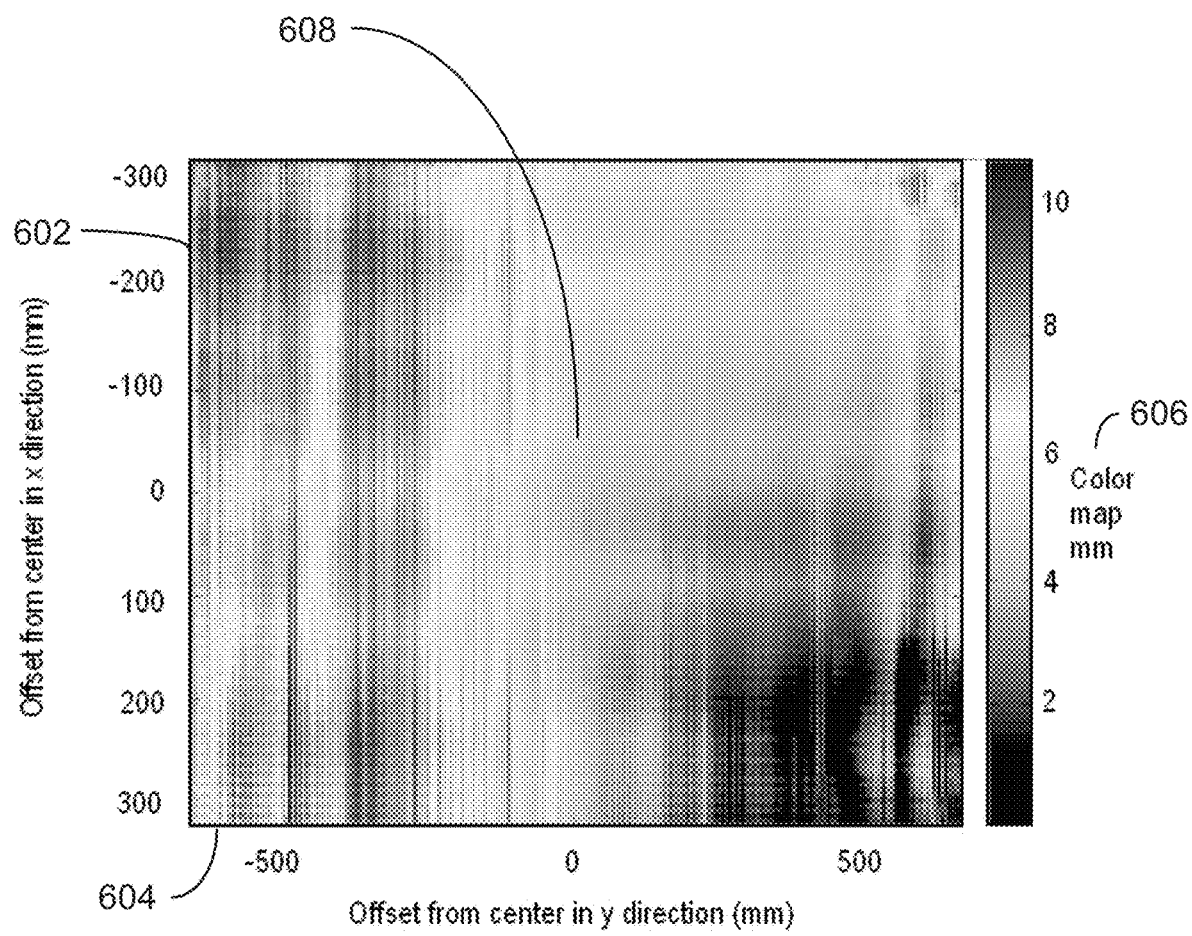
FIG. 6 is a graph showing the Euclidean error of pose estimation, in accordance with the claimed subject matter.

FIG. 6 is a graph 600 showing the Euclidean error of pose estimation, in accordance with the claimed subject matter. Specifically, the graph 600 shows the Euclidean error of the pose estimation algorithm over a 1320×640 mm area, obtained via the navigator. The average position error was 5 mm (=2 mm), and the average orientation error was 0.3 degrees (=0.2 degrees). Within the entire area, the position error did not exceed 22 mm, and the orientation error did not exceed 2 degrees. In a follow-up experiment, the navigator was moved within the same area at 40 mm increments, but at each position, 360 images were taken (at 1 degree intervals) using a servo mechanism to rotate the camera. The pose was estimated for each image, and the results were consistent. From perspective projection, it seems the maximum error due to pixel quantization is $$\text{quantization error} = pz/f, \quad (7)$$

where f is the focal length of the camera (4.8 mm), z is the distance to the landmark 106 (2200 mm), and p is the pixel size (5 μm). Given these values, the error due to pixel quantization is approximately 2 mm, which is consistent with these results.

Figures 7A, 7B:
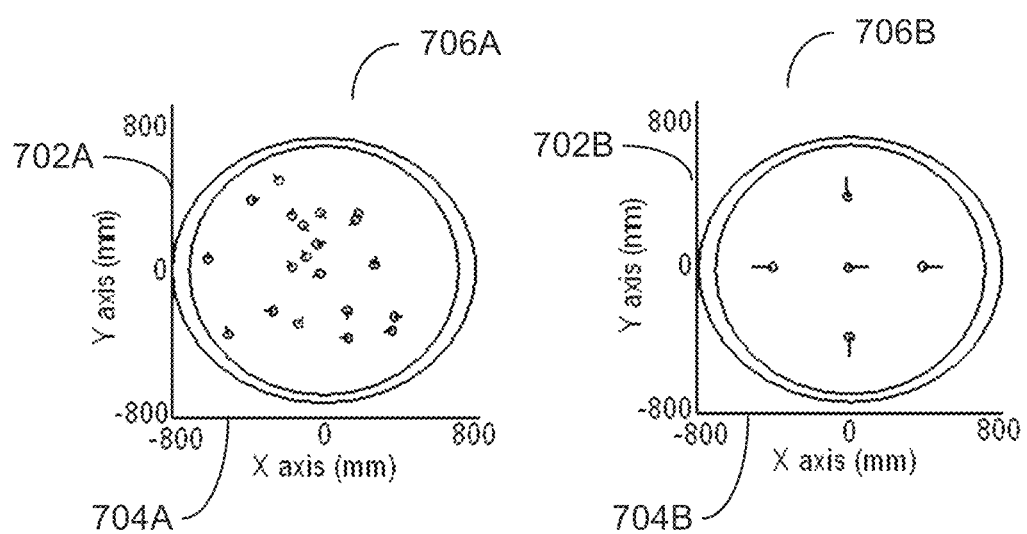
FIGS. 7A-7B are x-y coordinate systems showing random and canonical positions, in accordance with the claimed subject matter.
Figure 10:
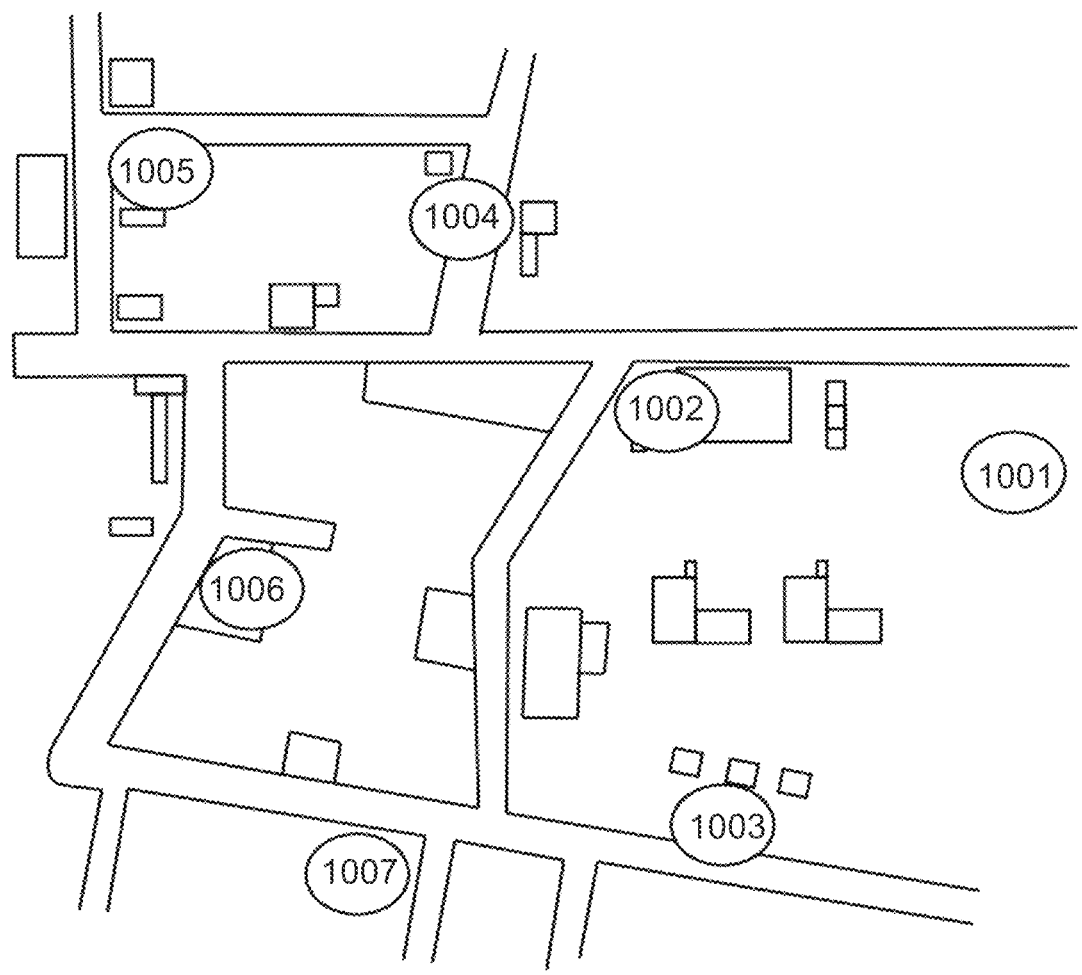
FIG. 10 is a block diagram of an example building with landmarks 106, in accordance with the claimed subject matter.
Figure 11:
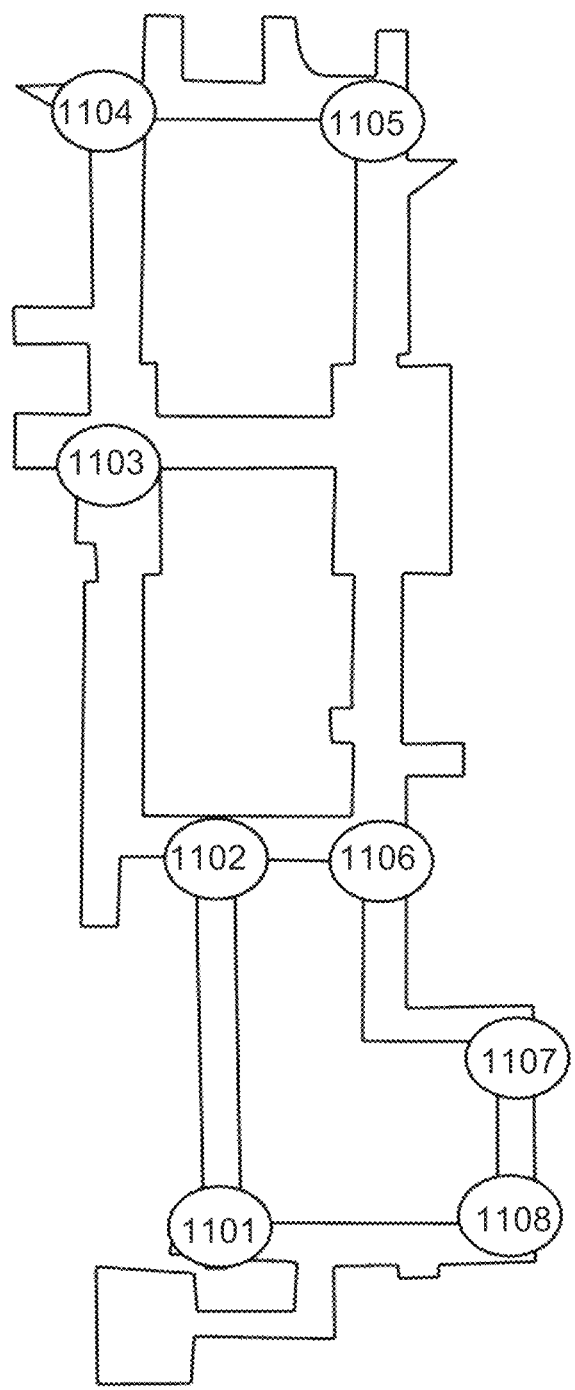
FIG. 11 is a block diagram of an example building with landmarks 106, in accordance with the claimed subject matter.

FIGS. 7A-7B are x-y coordinate systems showing random and canonical positions, in accordance with the claimed subject matter. After placing 25 landmarks 106 across 3 buildings (described with reference to FIGS. 10-12 below), the accuracy of the navigator was evaluated. One of the landmarks 106 was selected arbitrarily, and the robot was placed at 30 random positions underneath it. Then, at each landmark 106 the robot was placed at 6 canonical locations: (x, y,θ)=(0, 0, 0), (400, 0, 0), (−400, 0, 0), (0, 400, 0), and (0,−400, 0).

Figures 8A, 8B:
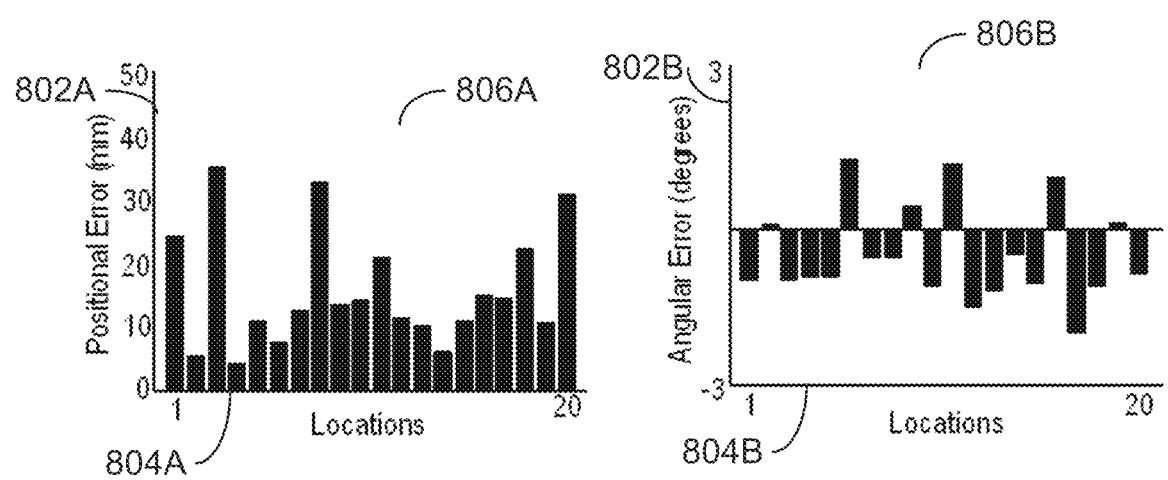
FIGS. 8A-8B are graphs showing position and orientation error for random positions.

FIGS. 8A-8B are graphs showing position and orientation error for the random positions. The actual ($r_x$, $r_y$, $r_θ$) of the robot was measured manually on the ground and compared with the values calculated as described above. The resulting Euclidean distance and orientation errors were computed, shown in FIGS. 8A and 8B. The Euclidean distance and orientation errors were calculated at all the landmarks 106 for these five canonical locations by comparing with manually obtained values. For both experiments, the combined mean position error was 15.2 mm (δ=9.1 mm), and mean orientation error, −0.4 degrees (δ=0.8 degrees). The maximum errors were 43.7 mm and 2.8 degrees.

Figure 9A:
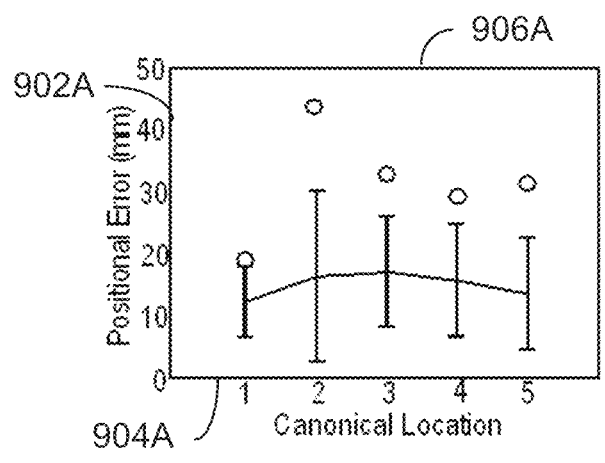
FIGS. 9A-9B are graphs showing position and orientation error for canonical positions, in accordance with the claimed subject matter.
Figure 9B:
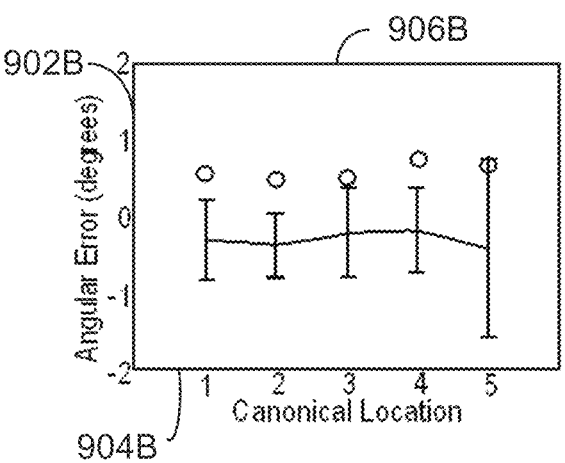

FIGS. 9A-9B are graphs 900A, 900B showing position and orientation error for canonical positions, in accordance with the claimed subject matter. Specifically, the graphs 900A, 900B show position and orientation error for 7 canonical positions over all landmarks 106.

An existing robot navigation system was used to verify the ease of deployment, ease of use, and accuracy of the claimed subject matter. To verify the ease of deployment, the time and expense was determined for setting up the ground truth estimation system 100 for use in two environments: Building A and Building B, shown in FIGS. 10 and 11, which are block diagrams of example buildings 1000, 1100 with landmarks, in accordance with the claimed subject matter. In Building A, the landmarks were placed at the elevators (1001), cafe (1002), lounge (1003), workshop (1004), copy room (1005), kitchen (1006), and supply room (1007).

Building A is approximately 55 m by 23 m consisting of generally uniform hallways with 21 foot drywall ceilings. The Building B space is approximately 57 m by 52 m and contains a combination of open space and hallways, with ceilings made of a variety of materials including drywall, acoustic tile, and decorative wood paneling. Seven landmarks 1001-1007 were mounted in Building A, and eight landmarks 1101-1108 were mounted in Building B. Installation of each landmark took about 35 minutes, including surveying the available space, affixing the landmark to the ceiling, and performing the landmark calibration procedure. The robot camera calibration was calculated at the same time as the landmarks. A professional printing service was used to create the foam-core landmarks, which were attached with damage-free hanging strips, for a total cost of less than $200 U.S. dollars. In each case, the landmark position was chosen to provide ample coverage of the building. The landmarks in Building A were positioned at hallway junctions, while the landmarks in Building B were positioned at points of interest around the building. One of the challenges in Building B were locations where flooring changed from carpet to tile, and where floor vents and floor access panels were present. An uneven floor reduces accuracy in position measurement. Such locations could, however, still be used to provide a binary result (i.e., the robot is under the landmark), but to enable accurate measurement, areas that provided uniform floor level in the vicinity of the landmark were selected.

To verify the ease of use, Building A was used to conduct automated navigation tests over two days during which a robot navigated to a 218-sequence of landmarks in random order. The position measurement system operated entirely autonomously and provided detailed position and orientation error information for the duration of the 9 hours of testing without any manual intervention and could continue to do so as long as the landmarks do not move, and the camera remains calibrated. In fact, these landmarks have been in continuous use for the past several months in a lab, providing daily metrics information for autonomous robot navigation. One advantage of the system is that, once deployed, there is no further maintenance. There are no cables or power cords, and the landmarks do not interfere with people's daily activities. To verify the accuracy, the Building B space was used to conduct automated navigation tests during which the same robot was used to map the space, record goals at each landmark, then navigate a randomly generated 25-waypoint sequence. During mapping, the position and orientation of the robot was recorded by the landmark system, and at the same time, its position and orientation was marked manually on the floor using colored duct tape.

Figure 12:
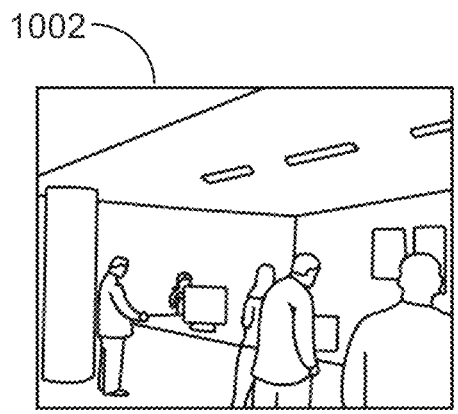
FIG. 12 includes images of example landmarks 106, in accordance with the claimed subject matter.
Figure 12:
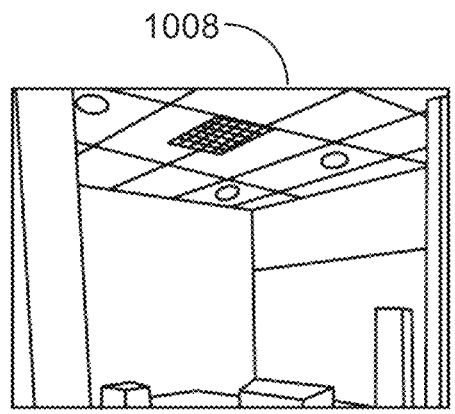
Figure 12:
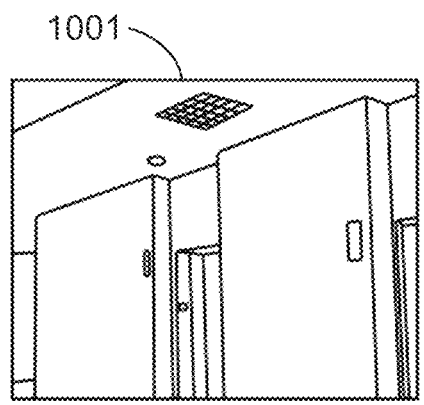
Figure 12:
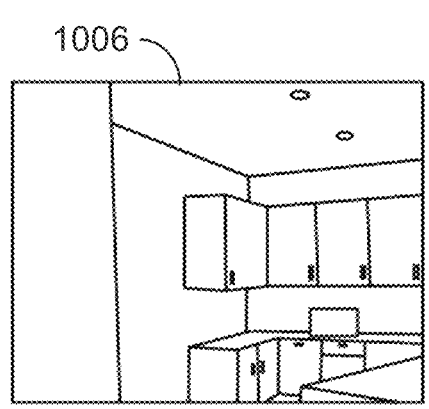
Figure 12:
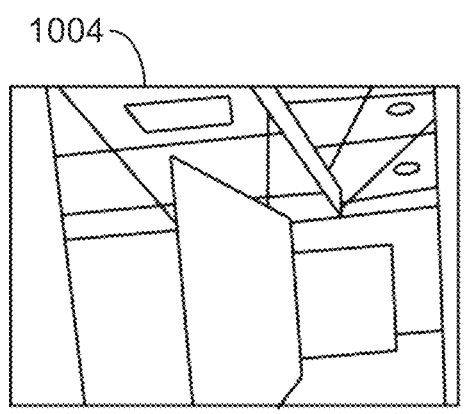

FIG. 12 includes images of example landmarks, in accordance with the claimed subject matter. This includes images of landmarks 1202, 1208, 1201, 1206, and 1204, respectively from left to right, the cafe, supply room, elevator, kitchen, and workshop.

After the sequence had been traversed, the Euclidean distance between the original mapped position and each visited position was measured manually, as well as the difference in orientation. Results are shown in FIG. 13, where the close agreement between the manually obtained values and automatically obtained values is evident.

Figure 13A:
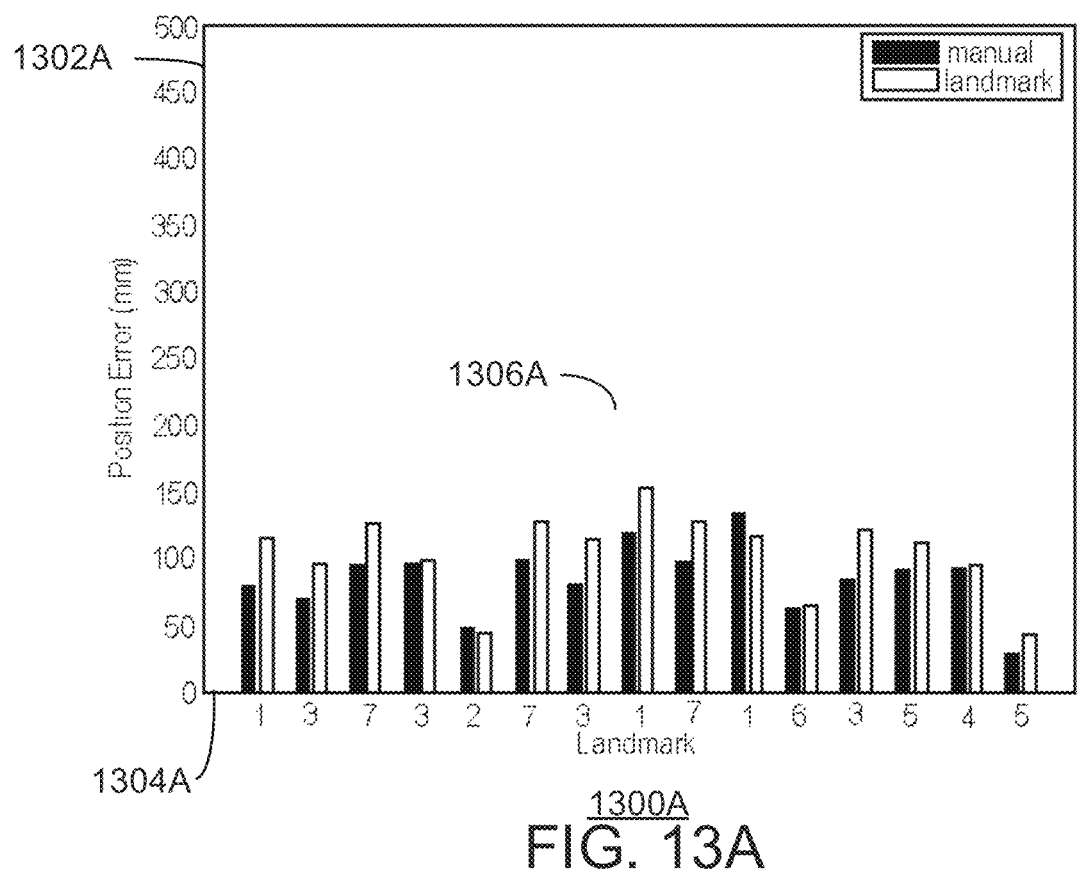
FIGS. 13A-13B are graphs showing position and orientation error, in accordance with the claimed subject matter.
Figure 13B:
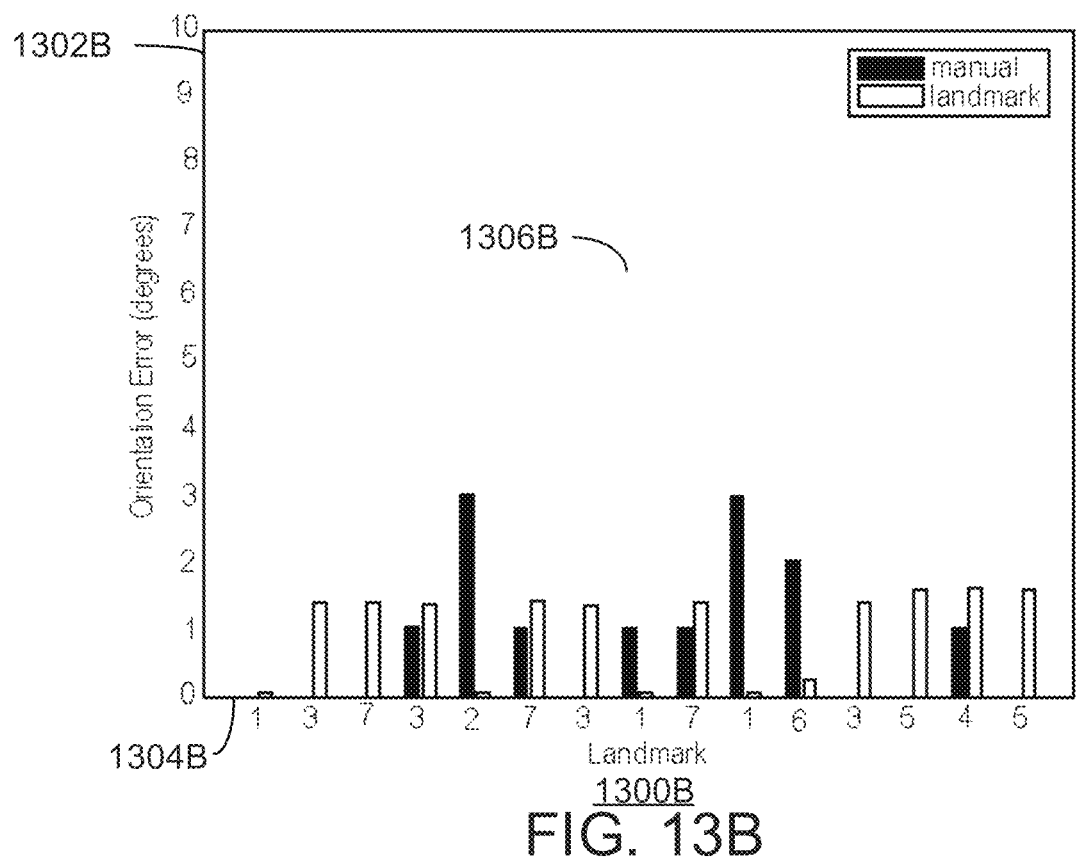

FIGS. 13A-13B are graphs showing position and orientation error, in accordance with the claimed subject matter. In Building B for the 25-waypoint sequence, shown are the absolute errors determined manually and by using the automatic landmark pose estimation system.

Figure 14:
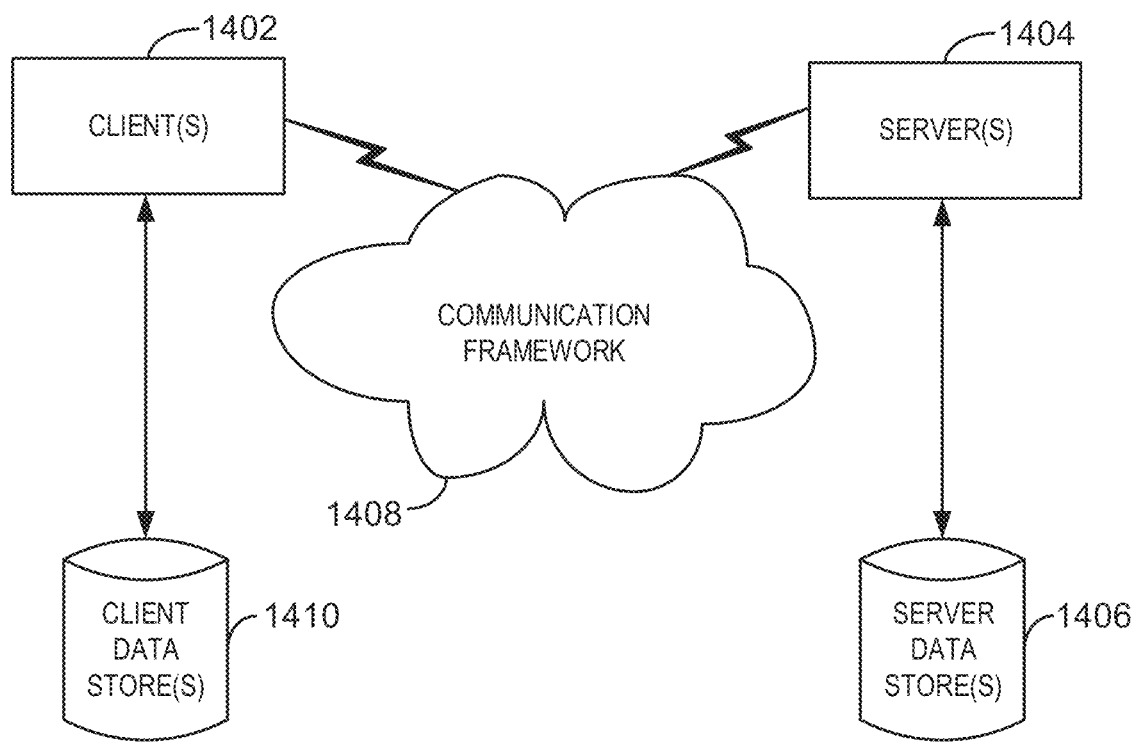
FIG. 14 is a block diagram of an exemplary networking environment wherein aspects of the claimed subject matter can be employed.

FIG. 14 is a block diagram of an exemplary networking environment 1400 wherein aspects of the claimed subject matter can be employed. Moreover, the exemplary networking environment 1400 may be used to implement a system and method for providing ground truth estimation for autonomous navigation systems as described herein.

The networking environment 1400 includes one or more client(s) 1402. The client(s) 1402 can be hardware and/or software (e.g., threads, processes, computing devices). As an example, the client(s) 1402 may be client devices, providing access to server 1404, over a communication framework 1408, such as the Internet.

The environment 1400 also includes one or more server(s) 1404. The server(s) 1404 can be hardware and/or software (e.g., threads, processes, computing devices). The server(s) 1404 may include a server device. The server(s) 1404 may be accessed by the client(s) 1402. One possible communication between a client 1402 and a server 1404 can be in the form of a data packet adapted to be transmitted between two or more computer processes. The environment 1400 includes a communication framework 1408 that can be employed to facilitate communications between the client(s) 1402 and the server(s) 1404.

The client(s) 1402 are operably connected to one or more client data store(s) 1410 that can be employed to store information local to the client(s) 1402. The client data store(s) 1410 may be located in the client(s) 1402, or remotely, such as in a cloud server. Similarly, the server(s) 1404 are operably connected to one or more server data store(s) 1406 that can be employed to store information local to the servers 1404.

Figure 15:
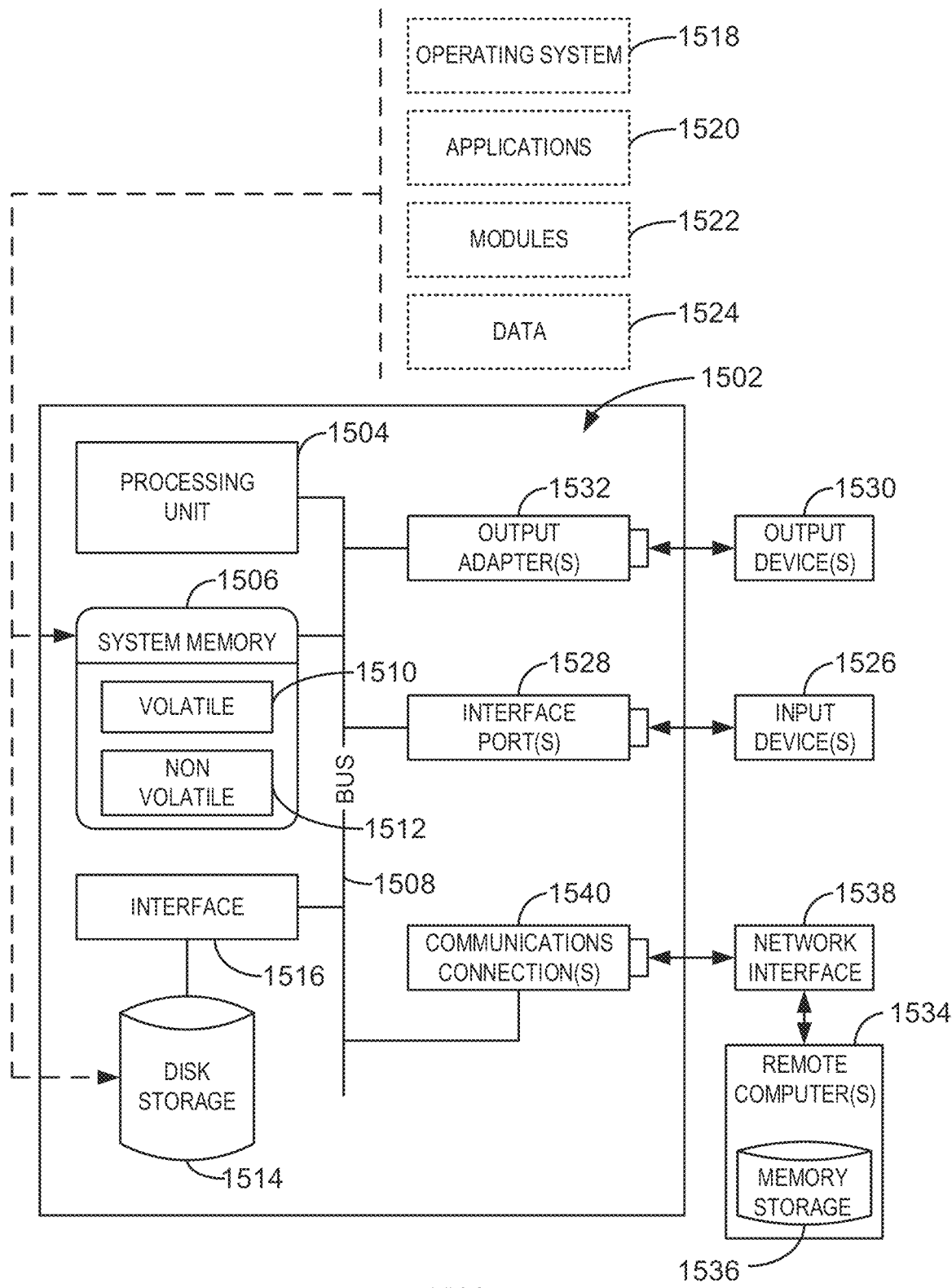
FIG. 15 is a block diagram of an exemplary operating environment for implementing various aspects of the claimed subject matter.

FIG. 15 is a block diagram of an exemplary operating environment 1500 for implementing various aspects of the claimed subject matter. The exemplary operating environment 1500 includes a computer 1502. The computer 1502 includes a processing unit 1504, a system memory 1506, and a system bus 1508.

The system bus 1508 couples system components including, but not limited to, the system memory 1506 to the processing unit 1504. The processing unit 1504 can be any of various available processors. Dual microprocessors and other multiprocessor architectures also can be employed as the processing unit 1504.

The system bus 1508 can be any of several types of bus structure(s) including the memory bus or memory controller, a peripheral bus or external bus, and/or a local bus using any variety of available bus architectures known to those of ordinary skill in the art. The system memory 1506 includes computer-readable storage media that includes volatile memory 1510 and nonvolatile memory 1512.

The basic input/output system (BIOS), containing the basic routines to transfer information between elements within the computer 1502, such as during start-up, is stored in nonvolatile memory 1512. By way of illustration, and not limitation, nonvolatile memory 1512 can include read only memory (ROM), programmable ROM (PROM), electrically programmable ROM (EPROM), electrically erasable programmable ROM (EEPROM), or flash memory.

Volatile memory 1510 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 1502 also includes other computer-readable media, such as removable/non-removable, volatile/nonvolatile computer storage media. FIG. 15 shows, for example a disk storage 1514. Disk storage 1514 includes, but is not limited to, devices like a magnetic disk drive, floppy disk drive, tape drive, Jaz drive, Zip drive, LS-210 drive, flash memory card, or memory stick.

In addition, disk storage 1514 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1514 to the system bus 1508, a removable or non-removable interface is typically used such as interface 1516.

It is to be appreciated that FIG. 15 describes software that acts as an intermediary between users and the basic computer resources described in the suitable operating environment 1500. Such software includes an operating system 1518. Operating system 1518, which can be stored on disk storage 1514, acts to control and allocate resources of the computer system 1502.

System applications 1520 take advantage of the management of resources by operating system 1518 through program modules 1522 and program data 1524 stored either in system memory 1506 or on disk storage 1514. It is to be appreciated that the claimed subject matter can be implemented with various operating systems or combinations of operating systems.

A user enters commands or information into the computer 1502 through input device(s) 1526. Input devices 1526 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and the like. The input devices 1526 connect to the processing unit 1504 through the system bus 1508 via interface port(s) 1528. Interface port(s) 1528 include, for example, a serial port, a parallel port, a game port, and a universal serial bus (USB).

Output device(s) 1530 use some of the same type of ports as input device(s) 1526. Thus, for example, a USB port may be used to provide input to the computer 1502, and to output information from computer 1502 to an output device 1530.

Output adapter 1532 is provided to illustrate that there are some output devices 1530 like monitors, speakers, and printers, among other output devices 1530, which are accessible via adapters. The output adapters 1532 include, by way of illustration and not limitation, video and sound cards that provide a means of connection between the output device 1530 and the system bus 1508. It can be noted that other devices and systems of devices provide both input and output capabilities such as remote computer(s) 1534.

The computer 1502 can be a server hosting various software applications in a networked environment using logical connections to one or more remote computers, such as remote computer(s) 1534. The remote computer(s) 1534 may be client systems configured with web browsers, PC applications, mobile phone applications, and the like.

The remote computer(s) 1534 can be a personal computer, a server, a router, a network PC, a workstation, a microprocessor based appliance, a mobile phone, a peer device or other common network node and the like, and typically includes many or all of the elements described relative to the computer 1502.

For purposes of brevity, a memory storage device 1536 is illustrated with remote computer(s) 1534. Remote computer(s) 1534 is logically connected to the computer 1502 through a network interface 1538 and then connected via a wireless communication connection 1540.

Network interface 1538 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1540 refers to the hardware/software employed to connect the network interface 1538 to the bus 1508. While communication connection 1540 is shown for illustrative clarity inside computer 1502, it can also be external to the computer 1502. The hardware/software for connection to the network interface 1538 may include, for exemplary purposes, internal and external technologies such as, mobile phone switches, modems including regular telephone grade modems, cable modems and DSL modems, ISDN adapters, and Ethernet cards.

An exemplary processing unit 1504 for the server may be a computing cluster comprising Intel® Xeon CPUs. The disk storage 1514 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for ground truth estimation for an autonomous navigation system (navigator), the method comprising:
    calibrating a ground truth estimation system for the navigator, by determining a calibration pose of a camera of the navigator as disposed in relation to each of a plurality of landmarks during a calibration period;
    directing the navigator to travel to a sequence of waypoints comprising a sequence of the landmarks during an evaluation period; and
    determining, using the calibrated ground truth estimation system, a ground truth estimation of the navigator based on an accuracy pose of the camera of the navigator as disposed in relation to the waypoints during the evaluation period, and the calibration poses disposed in relation to the plurality of landmarks.

2. The method recited in claim 1, comprising:
    mounting the landmarks in a plurality of spaces above a path of an environment the navigator is navigating; and
    mounting an upward-facing camera on the navigator.

3. The method of claim 2, comprising:
    mounting the landmarks in a plurality of spaces associated with the path of the environment the navigator is navigating; and
    mounting on the navigator, a camera facing in a direction of the spaces as the navigator navigates the path.

4. The method recited in claim 1, comprising generating a map during the calibration period, the map comprising a navigable environment comprising the landmarks, the map comprising an association between the landmarks and locations of the map.

5. The method recited in claim 1, wherein calibrating the ground truth estimation system, and determining the ground truth estimation, comprises:
    capturing an image of a landmark from an upward-sensing sensor of the navigator; and
    estimating a pose of the upward-sensing sensor in relation to the landmark.

6. The method recited in claim 1, wherein determining the ground truth estimation comprises:
    comparing the accuracy poses and the calibration poses; and
    determining the ground truth estimation based on a similarity of the accuracy poses to the calibration poses.

7. The method of claim 1, the navigator comprising a robot, the robot traveling during the calibration period and the evaluation period in response to the directing, and in response to a stimulus associated with an environment the navigator is navigating.

8. The method of claim 1, determining a pose comprising estimating a tilt angle and an azimuth angle of an optical axis of the camera mounted on a robot comprising the navigator, the tilt angle and the azimuth angle being with respect to an x,y,z frame centered on wheels of the robot.

9. The method of claim 1, comprising estimating noise in a sensor by running a robot between landmarks multiple times, and calculating a variance of error between different runs for the sensor.

10. The method recited in claim 1, comprising determining a tilt of a floor the navigator is navigating during the calibration period.

11. A system for ground truth estimation, comprising:
    a processing unit; and
    a system memory, wherein the system memory comprises code configured to direct the processing unit to:
        calibrate a ground truth estimation system for an autonomous navigation system (navigator), by determining a calibration pose of a camera of the navigator as disposed in relation to each of a plurality of landmarks during a calibration period, the landmarks mounted on a ceiling above an environment navigated by the navigator;

direct the navigator to travel to a sequence of waypoints comprising a sequence of the landmarks; and determine, using the calibrated ground truth estimation system, a ground truth estimation of the navigator based on an accuracy pose of the camera of the navigator as disposed in relation to the waypoints during an evaluation period, and the calibration poses disposed in relation to the plurality of landmarks.

12. The system recited in claim 11, the navigator comprising:

an upward-facing sensor;

a navigator processing unit; and a navigator system memory, comprising code configured to direct the navigator processing unit to:

travel, in response to commands from the ground truth estimation system, to all locations associated with the landmarks during the calibration period;

capture an image of a landmark associated with each of the locations when arriving at each of the locations; and notify the ground truth estimation system the navigator is stopped and located in proximity with the landmark.

13. The system recited in claim 12, comprising generating a map during the calibration period, the map comprising the environment navigated by the navigator comprising the landmarks, the map comprising an association between the landmarks and the locations.

14. The system recited in claim 12, wherein the ground truth estimation system is calibrated by:

for all the landmarks, capturing an image of each landmark from an upward-sensing sensor of the navigator;

for all the landmarks, estimating a pose of the upward-sensing sensor in relation to each landmark; and transforming an x-y-z coordinate system of the upward-sensing sensor to an x-y-z coordinate system of the navigator.

15. The system recited in claim 12, the navigator comprising a robot, the robot traveling during the calibration period and the evaluation period in response to the directing, and in response to a stimulus associated with the environment the navigator is navigating.

16. The system recited in claim 15, the environment navigated by the navigator, comprising a floor location directly beneath one landmark, the floor location comprising different surfaces, wherein positioning the navigator directly below the landmark comprises locating a roller of the navigator on all the different surfaces, the ground truth estimation system compensating for the different surfaces in relation to determining a calibration pose associated with the landmark, and in relation to determining an accuracy pose associated with the landmark.

17. The system recited in claim 15, the environment navigated by the navigator, comprising a floor location directly beneath one landmark, the floor location comprising different surfaces, wherein positioning the navigator directly below the landmark comprises locating a roller of the navigator on all the different surfaces, the ground truth estimation system compensating for the different surfaces by directing the robot to exclude the one landmark.

18. The system recited in claim 11, wherein a ground truth is estimated, by:

for a specified set of the landmarks, capturing an image of each landmark from an upward-sensing sensor of the navigator;

for the specified set of the landmarks, estimating a pose of the upward-sensing sensor in relation to each landmark;

comparing the accuracy poses and the calibration poses; and determining the ground truth estimation based on a similarity of the accuracy poses to the calibration poses.

* * * * *